Patented Mar. 10, 1953

2,631,144

UNITED STATES PATENT OFFICE 2,631,144

ACTIVATION OF CELLULOSE

Lejaren Arthur Hiller, Jr., Waynesboro, Va., assignor to E. I. du Pont de Nemours and Company, Wilmington, Del., a corporation of Delaware No Drawing. Application October 23, 1950, Serial No. 191,737

7 Claims. (Cl. 260—229)

The present invention relates to the activation of cellulose by heat preparatory to basic catalyzed esterification. More particularly, the invention relates to the oven drying of cellulose at an elevated temperature whereby the cellulose is activated for subsequent acetylation with acetic anhydride in the presence of potassium acetate and optionally in the presence of an organic compound such as dimethylformamide.

By "basic catalyzed" is meant the catalysis of the esterification using such substance as sodium, potassium, and lithium acetate.

It is commonly recognized in the cellulose ester art that for optimum results cellulose needs to be activated prior to its esterification with fatty acid anhydrides and catalysts. This treatment is referred to ordinarily as pre-treatment, pre-soaking or activation. In addition to chemical pre-treatments, either by acidic or alkaline processes, one of the effective ways which has been disclosed in the prior art of increasing cellulose reactivity for acetylation has been to use a dwelling treatment. An example of such technique is the "water activation" method which is frequently used in preparing cellulose for acid catalyzed esterification. In this particular process, the cellulose structure is distended by first allowing it to swell in water. The water held in the cellulosic structure is then replaced with a reagent such as acetic acid through several successive washings therewith. As a result, a highly reactive substance is swollen with a reagent which is normally employed as a diluent in acetylations catalyzed by strong acids.

The attractive possibilities of prior art teachings, such as the one mentioned above, would appear offhand to lend themselves to use in the basic catalyzed procedure. Yet such is not the case. Even though this technique has been modified so as to be better adapted for the basic catalyzed process, i. e., dimethylformamide has been substituted for acetic acid as a reagent to replace water after swelling, the swollen cellulose instead of being more completely acetylated reacts to a lesser extent. In order for the rapid basic catalyzed procedure to compete commercially with the acid catalyzed process, a simple, inexpensive and efficient pre-treatment is desirable.

It is, therefore, an object of this invention to provide a method of activating cellulose to render it more readily and uniformly reactive with lower fatty acid anhydrides in esterification processes involving basic catalysts and optionally, those involving the use of added organic compounds such as N,N-dimethylformamide, N-formyl morpholine, N-acetyl morpholine, gamma-butyrolactone, and gamma-calerolactone. Another object of the invention is to provide a simple yet expedient method of activating cellulose which does not involve excessively long periods of time, nor the typing up of expensive equipment. A further object is to provide a process of drying cellulose preparatory to esterification in which the moisture content of the cellulose may be reduced below 2% or even 1% of moisture without deleteriously affecting the cellulose in any way, while simultaneously enhancing its reactivity. A still further object of the invention is to provide for a process of activating cellulose seemingly independent of water removal and free of exacting conditions of time and temperature. Other objects of the invention appear herein.

In its broadest aspects, the invention comprises heat treating cellulose, preferably in an oven, at an elevated temperature for an appreciable period of time prior to esterification with an acid anhydride in the presence of a basic catalyst and optionally in the presence of certain organic compounds claimed in co-pending cases Serial Nos. 224,829 and 224,830 whereby the reactivity of cellulose is enhanced for subsequent esterification. It has been further found that it is unnecessary to keep the cellulose anhydrous between the pre-treatment and the actual esterification, for the increased reactivity is not lost upon rewetting the cellulose. Still further, swelling is not essential in the process of this invention.

A typical process in accordance with the invention is one in which a quantity of cellulose pulp was divided into two parts, one part was placed in an oven at 105° C. and thoroughly dried therein. After about 20 hours of drying, the cellulose is acetylated by refluxing it in a solution containing 150 cc. of acetic anhydride and 150 cc. of N,N-dimethylformamide (DMF), and 5 g. of potassium acetate. Instead of the expected 3 or 4 hour reaction time, a reaction product having a combined acetic acid content of 58% is obtained in about 45 minutes. The second part was not given the drying treatment; but was treated otherwise under comparable conditions. The product has a combined acetic acid content of only 52.25% after one hour of reaction. Even after a total reaction period of four hours the combined acetic acid content of the ester does not approach 58% but remains in the neighborhood of 53%. If the basic catalyst is omitted the esterifications are very slow and incomplete.

The following examples, given for illustrative purposes only, show in greater detail the pre-treatment of cellulose in accordance with the invention:

Example I

A quantity of wood pulp was steeped in water, then divided into approximately two equal batches. One-half of the material was allowed to dry at room temperature; the other half was oven-dried at 120° C. for a period of about 20 hours. In a series of tests five parts by weight of room temperature, air-dried material (control) and 5 parts by weight of the oven-dried batch were subjected to the acetylating conditions described in Table I, shown below. All reactions were carried out for a period of one hour at the reflux temperature. The quantities shown in the following tables are parts by weight unless otherwise indicated.

TABLE I

| Acetic Anhydride | DMF | Potassium Acetate | Cellulose Pretreatment (Type of Drying) | Percent Combined Acetic Acid |
|---|---|---|---|---|
| 162 | 0 | 2.5 | Room Temp. | 36.3 |
| 162 | 0 | 2.5 | Oven | 40.7 |
| 162 | 0 | 10.0 | Room Temp. | 52.6 |
| 162 | 0 | 10.0 | Oven | 55.7 |
| 81 | 71 | 2.5 | Room Temp. | 53.6 |
| 81 | 71 | 2.5 | Oven | 59.5 |
| 22 | 123 | 2.5 | Room Temp. | 56.8 |
| 22 | 123 | 2.5 | Oven | 58.9 |
| 22 | 123 | 10.0 | Room Temp. | 59.5 |
| 22 | 123 | 10.0 | Oven | 59.4 |

The data shown in the above table clearly demonstrate the activation resulting from oven drying of wood pulp preparatory to basic catalyzed acetylation. Activation at the oven temperature is faster and leads to greater results. Further, the heat treatment is effective in the absence of the organic compounds used in copending cases Serial Nos. 224,829 and 224,830.

Example II

A second series of reactions were performed using cotton linters. As in the previous example, one-half of the material was not heat-treated prior to acetylation under the conditions shown below in Table II; while the other half was dried in an oven at 105° C. for sixteen hours prior to being reacted under identical experimental conditions.

TABLE II

| Acetic Anhydride | DMF | Potassium Acetate | Length of Reaction | Cellulose Pretreatment | Percent Combined Acetic Acid |
|---|---|---|---|---|---|
| 162 | 0 | 2.5 | 15 | None | 21.69 |
|  |  |  |  | Oven dried | 25.14 |
| 162 | 0 | 2.5 | 30 | None | 29.37 |
|  |  |  |  | Oven dried | 32.60 |
| 162 | 0 | 2.5 | 60 | None | 30.75 |
|  |  |  |  | Oven dried | 36.60 |
| 81 | 71 | 2.5 | 15 | None | 33.00 |
|  |  |  |  | Oven dried | 38.40 |
| 81 | 71 | 2.5 | 30 | None | 41.40 |
|  |  |  |  | Oven dried | 44.95 |
| 81 | 71 | 2.5 | 60 | None | 51.45 |
|  |  |  |  | Oven dried | 55.15 |

The results which are depicted in the above table indicate the pronounced activation which occrues from oven drying of cellulose (cotton linters) upon acetylating the same in the presence of a basic catalyst for periods of time ranging from 15 minutes to one hour.

Example III

About 100 parts of pulp were dried at 105° for 60 hours. One-half of this dried material was steeped in water and allowed to dry at room temperature to equilibrium moisture content. The other half was not rewetted. Samples of anhydrous and rewetted cellulose (5 parts by weight) were subjected to a series of basic catalyzed acetylations under the conditions shown in Table III which follows:

TABLE III

| Conditions of Cellulose | Acetic Anhydride | DMF | Potassium Acetate | Percent Combined Acetic Acid in | |
|---|---|---|---|---|---|
|  |  |  |  | 30 Min. | 1 Hr. |
| Anhydrous | 162 | 0 | 5 | 43.5 | 51.2 |
| Rewetted | 162 | 0 | 5 | 43.6 | 56.8 |
| Anhydrous | 81 | 71 | 2.5 | 59.5 | 59.5 |
| Rewetted | 81 | 71 | 2.5 | 56.1 | 60.3 |
| Anhydrous | 22 | 123 | 2.5 | 56.1 | 58.9 |
| Rewetted | 22 | 123 | 2.5 | 55.3 | 59.0 |

The series of acetylations described in the above table (Table III) demonstrate clearly the non-essentialness of maintaining the cellulose in an anhydrous condition during the period from oven drying till the commencement of esterification.

While the invention has been described above with reference to the activation of cotton linters and wood pulp cellulose, it is to be realized that this is done for convenience sake only, inasmuch as the pre-treatment hereinafter claimed may be applied to all types of cellulose esterifiable by the basic catalyzed process. Due to the effectiveness of the oven treatment, a better product will be obtained upon acetylation regardless of the type of esterifiable cellulose used.

The activated cellulose obtained by practice of the invention may be employed for making other esters than cellulose acetate, e. g., cellulose propionate, cellulose propionate-butyrate and the like. In making the latter type of derivative, at least a large proportion or even the entire anhydride may be propionic or butyric anhydride as the esterifying agent. As these anhydrides are more sluggish in the acetylating effect than acetic anhydride, it is important that the cellulose employed therein be highly reactive.

It is to be understood that all basic catalysts with or without the organic activators which are disclosed in the companion cases Serial Nos. 224,829 and 224,830 are applicable herein. Any basic catalyst and any of these organic activators can be used in a wide variety of combinations. It is to be further understood, however, that the invention is applicable only to basic catalyzed esterification. For acid catalyzed esterification of cellulose, the oven pretreatment has proven detrimental.

Although the preferred embodiment of the invention involves drying the cellulose in an oven, other heat treating methods known to those skilled in the art are applicable. As regards the temperature of drying, studies indicate that temperatures ranging just above room temperature to about 150° C. and higher are operative, depending upon the degree of activation desired. Generally speaking, the higher the temperature of the drying oven the more effective the activation. Temperatures of about 75° C. up to about 125° C. are operable affording rapid moisture removal. Normally a temperature of about 100° C. is used, temperatures of 100° C. to 110° C. being prefered. Temperatures materially above 130° C. are not used since at such elevated temperatures degradation and charring begin to occur.

Since the degree of activation is at least approximately proportional to the temperature and the time of drying, these two variables may be adjusted over a wide range to give satisfactory results. For example, a drying cycle of 16 hours is recommended when cotton linter cellulose is dried at 105° C.

The time of drying is, of course, dependent upon the amount of moisture initially present which varies from small amounts for unswollen cellulose to considerable amounts for swollen cellulose. Usually a time range of 2 to 4 up to 10 to 20 hours will suffice in the two instances, respectively, although shorter or longer times may be used.

Although the mechanism of the activation by heat process is not definitely settled, it is believed that the beneficial results achieved are due to a thermal change rather than a moisture removal. Heat treating cellulose may result in a certain amount of structural change (degradation) which is beneficial in terms of activation. It may involve the formation of condensed amorphous regions recently termed "vitreous" cellulose which are tightly bound through hydrogen bonding.

By practice of this invention, an efficient method of activating cellulose preparatory to basic catalyzed esterification is provided. The so-called heat pretreatment step allows esterification to proceed more rapidly and more readily to high combined acetic acid ranges. Furthermore, the oven-dried cellulose appears to react more smoothly with fatty acid anhydrides and less trouble with the formation of poorly reacted lumps is encountered. A greater tendency toward dispersion in the reaction medium is apparent. Other advantages include adaptability to continuous esterification procedures, as well as to processes involving the manufacture of various types of cellulose derivatives.

Any departure from the procedure described herein which conforms to the principles of the invention is intended to be included within the scope of the claims below.

I claim:

1. In the esterification of cellulose with acid anhydrides in the presence of a basic catalyst, the improvement which comprises heating the cellulose prior to esterification at a temperature of about 75° C. to about 125° C.

2. A process in accordance with claim 1 in which the said temperature is about 100° C. to about 110° C.

3. A process in accordance with claim 1 in which the time of heating is about 2 hours to about 20 hours.

4. A process for esterifying cellulose with acid anhydrides which comprises activating the cellulose prior to esterification by heating it at a temperature of about 75° C. to about 125° C.; and treating the resultant activated cellulose with an acid anhydride in the presence of a basic catalyst.

5. A process in accordance with claim 4 in which the said anhydride is acetic anhydride.

6. A process in accordance with claim 4 in which the said catalyst is potassium acetate.

7. A process for esterifying cellulose with acid anhydrides which comprises activating the cellulose prior to esterification by heating it at a temperature of about 75° C. to about 125° C.; and treating the resultant activated cellulose with an acid anhydride in the presence of a basic catalyst and in the presence of an organic activator selected from the group consisting of an amide and a lactone.

LEJAREN ARTHUR HILLER, JR.

REFERENCES CITED

The following references are of record in the file of this patent:

UNITED STATES PATENTS

| Number | Name | Date |
| --- | --- | --- |
| 2,105,498 | Parett et al. | Jan. 18, 1938 |
| 2,289,085 | Halewijn | July 7, 1942 |
| 2,398,260 | Kantorowicz | Oct. 6, 1942 |

OTHER REFERENCES

Ott, "Cellulose and its Derivatives," 1943, page 676.